(12) United States Patent
Díaz Barroso et al.

(10) Patent No.: US 8,856,020 B2
(45) Date of Patent: Oct. 7, 2014

(54) METHOD FOR OPTIMIZING THE CONSUMPTION OF A TELECOMMUNICATIONS SERVICE

(75) Inventors: Fernando Díaz Barroso, Madrid (ES); Francisco Javier Carrasco López, Madrid (ES); Omar Briones Vilar, Madrid (ES); Pablo Aguiló Pastrana, Madrid (ES)

(73) Assignee: Telefonica, S.A., Madrid (ES)

( * ) Notice: Subject to any disclaimer, the term of this patent is extended or adjusted under 35 U.S.C. 154(b) by 1180 days.

(21) Appl. No.: 12/710,699

(22) Filed: Feb. 23, 2010

(65) Prior Publication Data

US 2011/0207430 A1    Aug. 25, 2011

(51) Int. Cl.
    *G06Q 30/02*    (2012.01)

(52) U.S. Cl.
    USPC ........................................ 705/7.33; 705/7.35

(58) Field of Classification Search
    USPC .......................................................... 705/7.33
    See application file for complete search history.

(56) References Cited

U.S. PATENT DOCUMENTS

| | | | |
|---|---|---|---|
| 6,351,453 B1* | 2/2002 | Nolting et al. | 370/234 |
| 6,721,554 B2* | 4/2004 | Gnesda et al. | 455/406 |
| 6,947,723 B1* | 9/2005 | Gurnani et al. | 455/406 |
| 7,260,192 B2* | 8/2007 | Nolting et al. | 379/114.01 |
| 7,383,191 B1* | 6/2008 | Herring et al. | 705/1.1 |
| 2001/0051932 A1* | 12/2001 | Srinivasan et al. | 705/400 |
| 2004/0009762 A1* | 1/2004 | Bugiu et al. | 455/406 |

OTHER PUBLICATIONS

Costas Courcoubetis et al, Measurement-Based Usage Charges in Communications Networks, INFORMS, Operations Research, vol. 48, No. 4 (Jul.-Aug. 2000), pp. 535-548.*

* cited by examiner

*Primary Examiner* — Andre Boyce
(74) *Attorney, Agent, or Firm* — Ladas & Parry LLP

(57) ABSTRACT

The invention relates to a method for optimizing the consumption of telecommunications services in user groups. The method allows analyzing in real time the effectiveness of the multiple attributes of the commercial products associated with telecommunication services offered on a telecommunications network without excess calculations having to be generated, and at the same automatically acting accordingly on those attributes, optimizing the objective functions established by the telecommunications operator in the shortest possible time.

17 Claims, 10 Drawing Sheets

METHOD FOR OPTIMIZING THE CONSUMPTION OF A TELECOMMUNICATIONS SERVICE

FIELD OF THE INVENTION

The present invention is comprised in the field of telecommunications and, specifically, in the field of the telecommunications services offered on the infrastructure of a telecommunications network, for example, the services offered in the cellular mobile telephony networks.

BACKGROUND OF THE INVENTION

In the field of telecommunications services, the term "commercial product" and the attributes making up said commercial product are used to refer to the conditions with which a telecommunication service is offered to the users, in which conditions different variables used by telecommunications operators to market the telecommunication services that they offer on their networks (marketing mix) will be involved. Thus, for marketing a voice service on Internet protocol (IP), the operator can define a commercial product with various attributes: price of the monthly subscription fee, rate per minute of conversation, quality of the voice service on IP, offer of no fee for the first 3 months, etc. All these attributes make up the offered commercial product and, as observed, they can be prices, incentives or promotions, discounts, qualitative attributes of the service, etc. The choice of the value for all these attributes will determine the success of the commercial product offered by the operator for achieving his objectives.

One of the mechanisms most used by telecommunications operators for achieving the objectives of revenue generated by the telecommunication services and stimulating the demand for certain telecommunication services is the definition of promotions (a type of commercial product) which serve as an incentive for the users for their use or consumption. These promotions are commonly based on better conditions (price reductions, improvement of parameters of the service at the same price, etc.) of using or enjoying the service. Thus, for example, incentives performing a discount percentage on a base rate, incentives offering the purchase of the units of a service in batches or vouchers involving a lower price per unit, preferential conditions of quality of a service at the same price or gift or discounts in the consumption of other services due to having performed a certain consumption of the service the demand for which is to be encouraged can be found.

The main concept underlying these promotions is the elasticity of the demand: in certain services or goods there is the possibility of generating greater revenue upon offering better conditions of acquiring the good or service, since the increase of demand induced with the promotional offer is greater in percentage than the decrease of the margin obtained with the sale of the good or service due to the better conditions. The most basic example is the "elasticity of the demand" with respect to the price: a service is "elastic" with respect to the price when a decrease of the price of the service causes a greater increase in percentage of the demand and, therefore, of the revenue. Suppose that sending an SMS (short message of a Short Message Service, offered in mobile cellular networks and in fixed telephony networks) in the network of an operator has a cost for the user of 20 monetary units and that the usual demand for this service on Saturday is on average 3 SMSs per user of the network. With this scenario, the Average Revenue Per User (ARPU) on Saturday would be 60 monetary units. If an incentive involving a reduction of 25% of the unitary price of the short message, becoming 15 monetary units, is offered to the users, and the users increases their demand, resulting in a consumption of 5 short messages per user, the average revenue per user will now be 75 monetary units. This example demonstrates the elasticity which the demand for the short message service would have in this case, since a reduction of the price has allowed increasing the revenue obtained for this service.

Another very important concept for the effectiveness of the attributes chosen for a commercial product and widely used today is the segmentation of the users of the operator, defining user groups or segments to which the commercial most suitable products can be addressed to meet their consumption and achieve the commercial or economic objectives of the operator, using the elasticity. Until recently, telecommunication services were limited in number to a small set, but the inclusion of multimedia capacities in telecommunications networks is allowing the development of many varied telecommunications services. Due to this large range of services which is presented, telecommunications operators are detailing the concept of segmentation tending towards "microsegmentation" which allows defining small user groups to which adapted and customized services as well as conditions of payment and consumption suited to their preferences, can be offered, always with a view to guiding the behavior of use of such services such that the operator obtains greater revenue, profits or any other objective function considered. The determination of segments or groups can be performed according to many variables, but those related to the consumption by the users are fundamentally used. It is also usual to define user groups with aspects in common to which beneficial promotional conditions can be addressed, such as for example those formed by the Friends&Family of the user, or larger-sized groups formed by users with affinities (called "tribes" in certain sectors), the members of which are offered individual commercial products exclusively related to belonging to the group.

Current methods used to define the attributes of the commercial products for a service (either to establish the price of a service, a promotion, the association in a pack with other services) are fundamentally based on performing surveys on the users, the application of promotions which worked well in other services or the performance of pilot tests with very reduced user groups, which guide in the choice of the most suitable values for the attributes of the commercial product for that service. After that the specific commercial product (for example, a discount promotion) which is believed to be the most suitable for the user group for which it is intended, which in many cases will have a large number of users, is offered. Finally, after a time period in which the offer of the commercial product (for example, the period in which the promotion is active) has been valid, the historic data of purchase of the product and the consumptions of the corresponding service by the users are analyzed to evaluate the impact of the commercial product and take it into account for future definitions and launches of other commercial products (for example, future promotions).

The technical processes currently used to perform that analysis are based on consulting and analyzing information records included in large databases of the operators, called data warehouse. These databases contain millions of records with information provided by various elements of the telecommunications network of the operator and relative to the individual use of the service by each user. These databases are also commonly used to perform the segmentations of users into groups or segments, according to the aspects chosen by the operator, normally related to their individual patterns of consumption of the telecommunication services for the ones which are to be segmented: for example, a segmentation can be performed according to the number of minutes of conversation in telephone calls consumed by the users on average per day, designating a larger or smaller number of segments according to the established number of minute consumption levels. The analysis processes on these databases (known as data mining), both for determining the segmentation and for analyzing the consumptions with an offered commercial product, are usually costly in processing time due to the large number of records existing in said databases, corresponding to all the interactions of the users with the telecommunication network of the operator. This is added to the fact that increasingly more processing operations for different user groups and for multiple services are necessary.

This problem is emphasized if it is contemplated that in telecommunications services the patterns of consumption change over time due to seasonal mechanisms, isolated events or a combination of multiple external circumstances that are difficult to predict and quantify, i.e., there is a dynamic behavior over time in the demand of the users, which is variable also according to the user group considered. This involves that the demand for a commercial product (for example, for a promotion) does not have to be the same at different instants of time, whereby it is necessary to repeat the data analysis of the data warehouse which has been mentioned every certain time period. Suppose that a commercial product with promotion format, such as the discount in sending short messages mentioned above, starts to be offered in June, but only during a time slot of the day, for example, from 7 p.m. to 8 p.m. Upon performing an analysis of the consumption of the service during the first week by means of an analysis of the records of the data warehouse it is observed that it has entailed an increase of revenue for the operator. However, with the summer and holiday period which starts to be observed in July, the patterns of consumption vary and the incentive is no longer effective it is maintained in the mentioned time slot. If one refrains from processing records of the data warehouse with sufficient frequency, a delay is introduced in the detection of the ineffectiveness of the attributes of the commercial product and in the possibility of introducing corrective actions. On the contrary, raising the frequency with which records of consumption of the data warehouse are analyzed involves an extremely significant increase of number of calculations and operations, which involves a highly considerable burden on the equipment. This entire manner of proceeding causes unquestionable technical problems in relation to the capacity of a quick and dynamic analysis which allows knowing with very little delay the effectiveness that the attributes of a commercial product have for optimizing the demand of different user groups to achieve the objectives established by the operator, as well as in the capacity for dynamically modifying the attributes of said commercial product to adapt to the time variations of demand of the users, seeking to have at all time the optimal attributes of that commercial product.

On the other hand, the networks of telecommunications operators have a charging system which allows charging the users for the use, consumption or enjoyment of the services offered on said networks. The trend in the field of charging systems is to change to real-time charging systems (or OCS, Online Charging Systems) or hotbilling systems, in which with nil or very little delay the user is suitably charged for the use of a service according to his interaction with the network. In those systems, only the events of interest generated by the network are collected and they are analyzed at the same time, never accumulating data to subsequently process them as occurs in the case of the data warehouse. These charging systems furthermore have the configuration of prices, rates, consumption limits, etc., which are used to charge for the use of the different commercial products, such as the examples of promotions indicated above.

It is also known that in the field of commerce over the Internet (e-commerce), many vendors offer goods or services which "perish" or expire on a certain date (for example, airplane tickets or hotel accommodation) the price of which is dynamically modified over time as the purchase or consumption deadline date draws near and according to the inventory level that they still have of the good, for the purposes of optimizing their revenue or profits, taking into account that the unsold units on the deadline date will not generate any revenue. This price dynamization has been possible in online commerce as a result of the capacities offered by the Internet to be able to change and announce the new rates with hardly any cost.

However, outside the field of internet, in the world of telecommunication services it is very complex to use dynamization techniques due to the current features of the systems making up the telecommunication networks. Thus, for example, although the communication to the users of a change in the conditions of offering a service offered in a telecommunications network is not expensive as it is possible to use the actual communication mechanisms with which the network of the operator is provided, most of the systems related to charging need manual interventions to make rate changes in the telecommunication services.

Therefore, the need has been detected to find methods and systems to be implemented in current telecommunication networks which allow analyzing in real time the effectiveness of the multiple attributes of the commercial products associated with telecommunication services offered on a telecommunications network without excess calculations having to be generated, and at the same automatically act accordingly on those attributes, refining them with automatic dynamization methods, which optimize the consumption and the use of said product for the objective desired by the supplier of the commercial product or the operator of the telecommunications network. Furthermore, it is necessary to inform the users of the different groups or segments of which are the new attributes of the commercial product, resulting from the refining with the automatic methods.

United States patent application 2001/0051932 "Method and System For Dynamic Pricing" describes a method and system for conducting real-time experiments which allow determining the optimal values of marketing variables such as the price in the Internet business environment (e-commerce). The system allows performing that experimentation for differentiated client segments of the Internet business and obtaining the optimal values for each segment. However, the method used is focused on commerce over the Internet but does not describe a method which allows applying the experimentation and the dynamization in the environment of a classic telecommunications network and its associated services (for example, a GSM cellular network). As has been previously described, the services offered by a telecommunications operator imposes restrictions in the dynamization such as the integration with the billing systems of the operator (the complexity of the charging is considerably greater than in e-commerce websites), the need for a very quick convergence towards the optimal values with parallel experimentation in various user groups or effective methods for collecting the large amount of information relative to the consumption of the users generated by the network of the operator.

United States patent application US 2004/0009762 "Dynamic Pricing and Yield Management in Mobile Communications" describes a system for encouraging the consumption in a communications network, especially in low-traffic periods, by means of variations of the price of the services, thus allowing the operator to increase his revenue and use the capacity of the network which is not used, whereby a maximum return is achieved on the investment. The method and system are fundamentally focused on the segmentation of the users according to criteria and data extracted from the databases of the operator and from the CDRs generated by the network elements. The identified segments are offered incentives for consumption chosen by the operator of the system and the suitable measurements are taken to determine the elasticity observed in the demand with the incentive. The system is aimed at processing CDRs and at the post-process charging within the network.

The complexity of the commercial products which are launched in current telecommunication networks, with multiple attributes of a different field, makes a quick convergence towards the attributes which together form the optimal commercial product even more necessary, especially in services with demands which vary quickly. It is also important for the telecommunications operator to assure an integration as efficient as possible with the systems of the network of said telecommunications operator, which prevents an excessive use of the resources of the network and of the processing capacity of the equipment.

SUMMARY

The invention attempts to solve the aforementioned drawbacks by means of the real-time analysis of the attributes of a product associated with a service, as well as the automation of variations therein which contribute to encouraging the demand for said product.

In a first aspect, a method for optimizing the consumption of a telecommunications service is provided, in which said service is offered by means of a telecommunications network comprising a real-time charging system. The method comprises: defining a commercial product associated with said service, comprising a plurality of variable attributes and a set of values which said variable attributes can have; selecting a user group comprising n users of said service and a control user group comprising m users of said service; defining an objective function comprising a plurality of variables which allow measuring the consumption of said service; searching for the values for said variable attributes of the commercial product which optimize the objective function using the real-time charging system.

Preferably, said search for the values for said variable attributes of the commercial product which optimize the objective function is performed according to the following iterative cycle: selecting k subgroups from the group of n users such that no user can belong to more than one subgroup and assigning for each of said subgroups an instance of the commercial product by means of selecting different values for said variable attributes within the set of values which said variable attributes can have; collecting a plurality of measurements of consumption of said telecommunication service by the users of each subgroup during a certain time period, and starting counters associated with each of the variables of the objective function; communicating to the users of each subgroup the corresponding instance of the commercial product giving them the possibility of subscribing to same if said subscription is necessary; assigning in the real-time charging system of the operator the corresponding instance of the commercial product to the users of the subgroups; calculating and accumulating the counters associated with each of the variables of the objective function from the measurements collected by the real-time charging system relative to the consumption by the users of each of the subgroups of the service affected by the instance of the commercial product offered; at the end of said certain time period, calculating the k values of the objective function obtained from the consumption counters of each subgroup as well as the value of this objective function for the control group; applying a function optimization algorithm taking as an input the k values of the objective function of the previous step and the values obtained in previous iterations, thus obtaining the values of the variable attributes for defining the instances of the commercial product to be offered in the following iteration.

Preferably, the method further comprises: defining ending conditions for a search for the values of the variable attributes of said commercial product; and after each iteration, evaluating the ending conditions for the search for the values of the variable attributes and continuing with the following iteration.

The number k of subgroups can be equal to or greater than 1, being able to be different in each cycle.

The users forming part of the subgroups and of the control group can be randomly selected in an automatic manner or are explicitly defined by the operator of the system.

The objective function optimization algorithm can be applied without previously knowing or estimating the curve of demand for the telecommunications services affected by the commercial product.

In a particular embodiment, the optimization algorithm only considers the last measurements of the objective function taken within a window ignoring the previous measurements, in which said window is expressed in terms of time or number of iterations.

Optionally, the method further comprises: commercially exploiting the instance of the commercial product which optimizes the objective function, the optimal variable attributes of which have been obtained.

The search for new values for the attributes in the commercial exploitation phase can be started after a fixed time has elapsed from the last search or when the percentage of the change of the objective function for the users of the control group exceeds a defined threshold.

The values of the variable attributes of the commercial product calculated by the optimization algorithm and which are outside the search space of the solution can be automatically modified to be placed inside said space applying the criterion of minimizing the distance between the values of the attributes, or the search space of the variable attributes of the commercial product can be defined by indicating a range per attribute.

The objective function can contain variables measuring the consumption which is being made of services which are not the one linked to the commercial product offered.

If the commercial product includes its validity term or period as an attribute, the duration of an iteration can be the maximum value of said attribute for the instances of the commercial product (P) offered in said iteration.

In another case, the time period or term of an iteration can be configured by the operator of the telecommunications network as a single value for all the iterations or as a specific value for each of the iterations.

Furthermore, the method comprises interacting with the real-time charging system of the telecommunications operator to provide support for the capacity to dynamically generate instances of the commercial product, offering them to different groups, and calculating and adding the counters which allow evaluating the objective function from the consumptions by the users of these groups.

In another aspect of the present invention, a system comprising means adapted to carry out any of the methods described above is provided.

Finally, a computer program is provided which comprises computer program code means adapted to perform the stages of the method described above, when said program is executed in a computer, a digital signal processor, a field-programmable gate array, an application-specific integrated circuit, a microprocessor, a microcontroller, and any other form of programmable hardware.

BRIEF DESCRIPTION OF THE DRAWINGS

A series of drawings which aid in better understanding the invention, set forth as illustrative and non-limiting examples thereof, is very briefly described below.

DETAILED DESCRIPTION OF THE INVENTION

Figure 1:
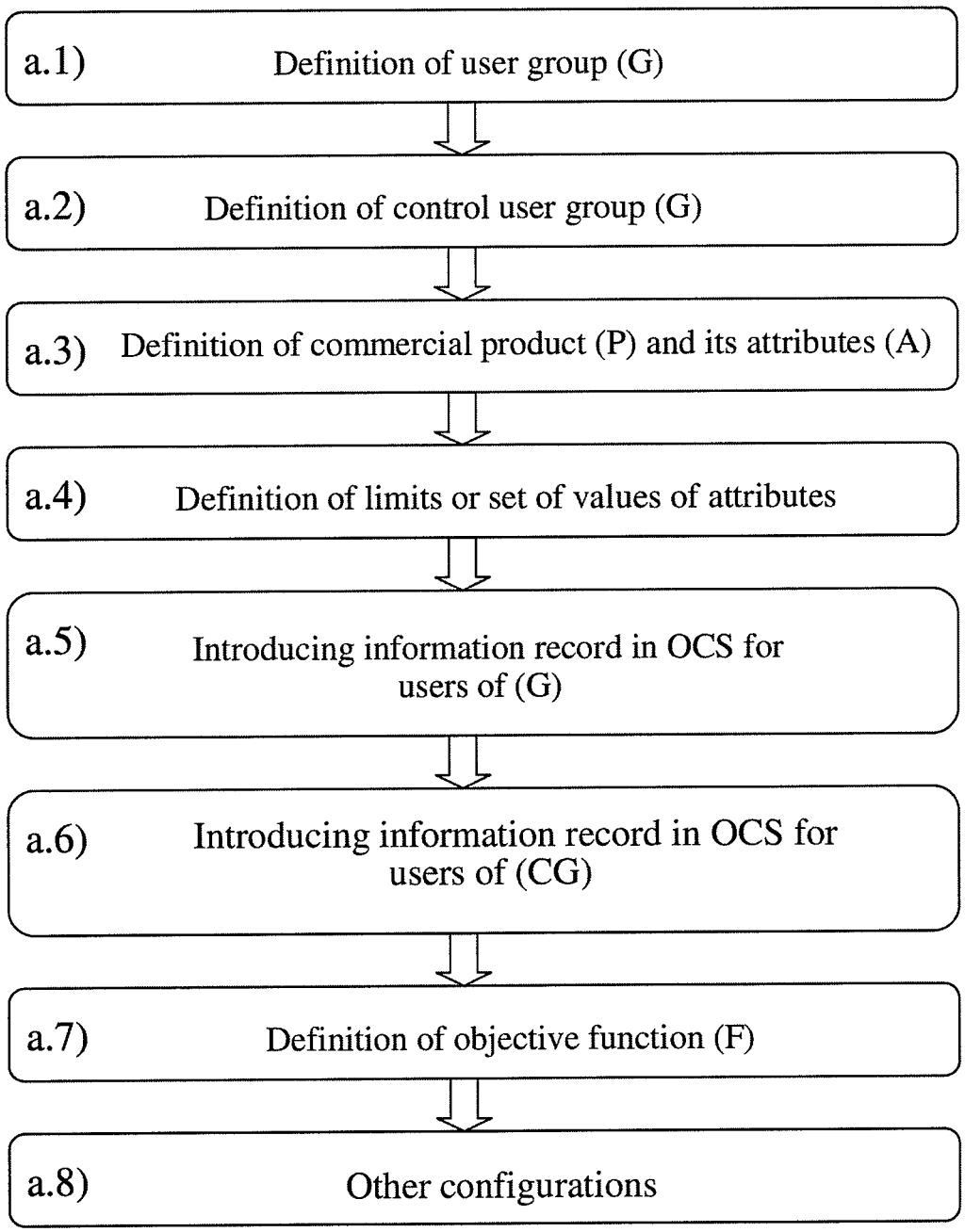
FIG. 1 schematically shows the steps of phase a) of the method of this invention.
Figure 2:
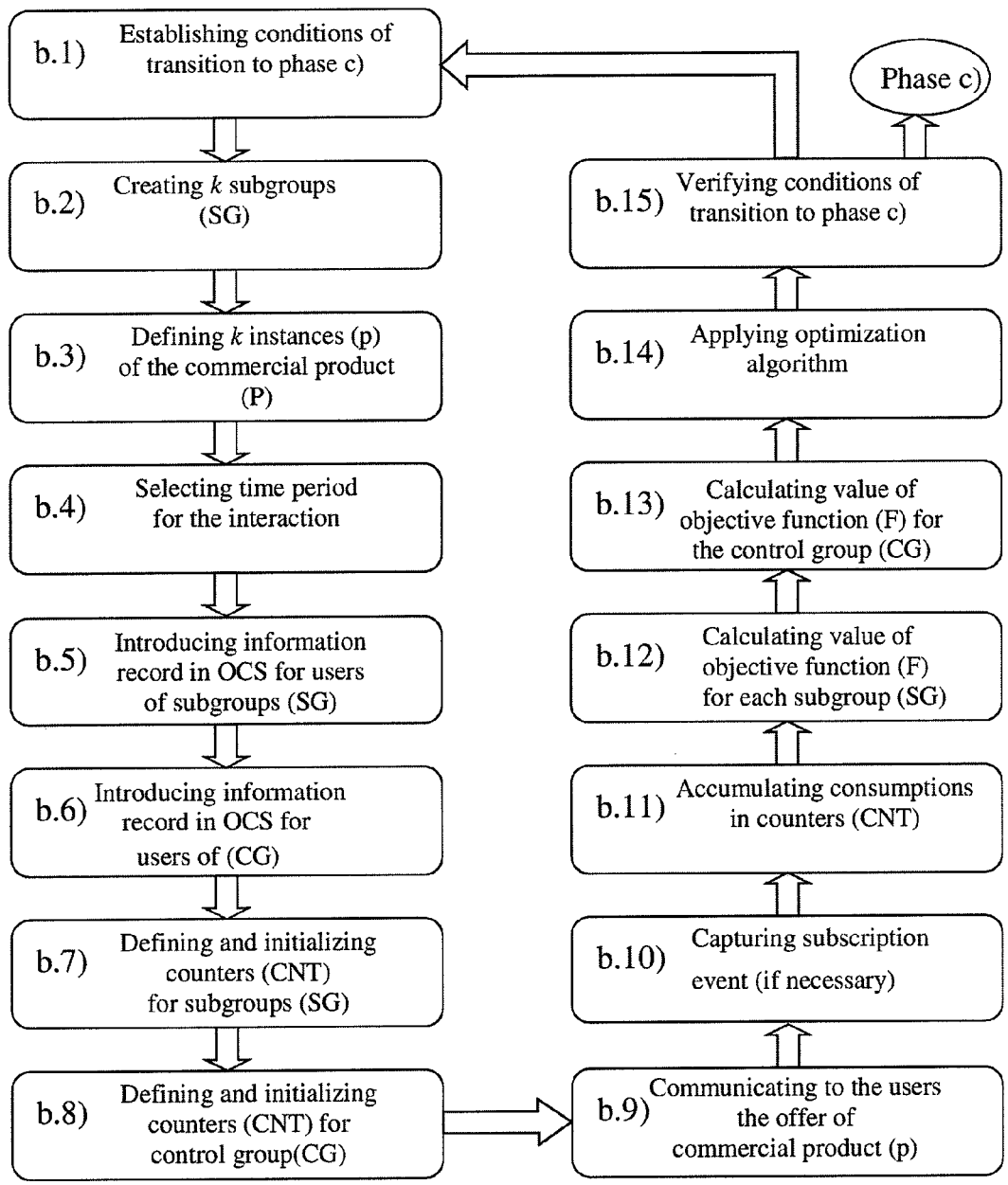
FIG. 2 schematically shows the steps of phase b) of the method of this invention.
Figure 3:
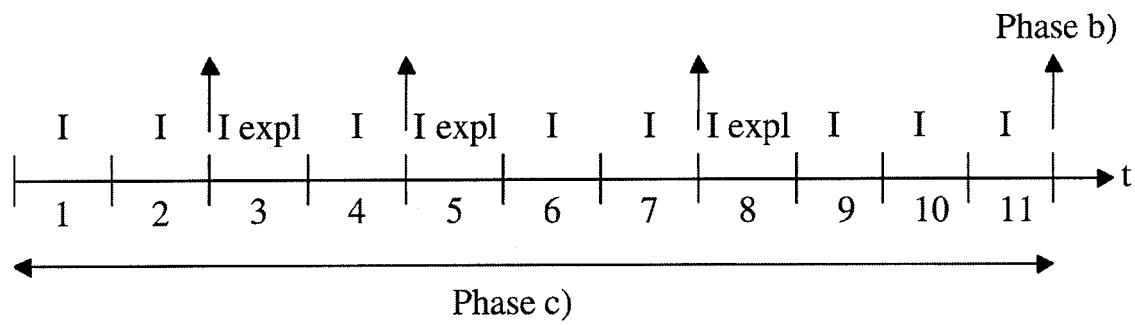
FIG. 3 shows an example of execution of phase c) compatible with the general concept of said phase.

The method is described below, considering its phases and the steps within each phase. FIG. 1 and FIG. 2 schematically show the steps of the first two phases (phases a) and b)). FIG. 3 depicts how, during phase c), there is a differentiation between normal iterations of commercial exploitation of the optimal commercial product and exploration iterations for detecting changes in the demand.

a) As a first phase, all the start-up and general initial configuration (set-up) processes relating to the method which is to be executed are performed. In subsequent phases there are steps of specific configuration of the phase, to be executed at the beginning of each phase. This phase comprises the following steps:

a.1) defining a user group (G) by selecting n users of the service of the telecommunication network of the operator the consumption of which is to be met through a commercial product to optimize an objective function defined by the operator. These users can be chosen by the operator according to different aspects, such for example demographic parameters or consumption parameters in relation to the service affected by the commercial product, as is performed with current segmentation or microsegmentation processes. Another alternative is the creation of a subscription group (G) in which people register to enjoy certain advantages associated with belonging to the group (G), the entrance in the group (G) being free or conditioned by certain parameters indicating any common affinity. In this alternative, the operator defines the group and the entrance conditions, but the composition is determined by the n users who subscribe to said group (G). The result of this step is a list of the n users making up the group (G). This list can be obtained, for example, from a database of the telecommunication operator in which the latter has defined the group, or it can be introduced by the operator by means of configuration files.

a.2) defining a control user group (CG) by selecting m users of the service of the telecommunication network of the operator relative to the commercial product which is offered to meet the demand of the users of the group (G). The users who belong to this control group (CG) are not offered said commercial product during the execution of the method, i.e., they cannot be users belonging to the group (G) at the same time. The m users making up this group (CG) must be selected such that they have the same profile or a profile similar to those of the group (G), according to the parameters which were used to select the users of that group or to define the entrance conditions in the group. Thus, as a non-restrictive option, the users of the control group (CG) can be obtained by the extraction from the group (G) of a relatively reduced subset of the users of said group (G) (for example, 5% of the users of the group); it is stressed that in this case an extraction of users of the group (G) would be performed reducing the number n of users of that group, since the group (G) and the control group (CG) must be disjoint; step a.6) gives the guidelines for handling this situation. Furthermore, in this latter case, the option is allowed that the operator selects each of the m users or that m users are chosen automatically from the n users making up the group (G), such that the m/n ratio considers the percentage indicated by the operator for the control group (CG). The result of this step is a list of the rn users making up the control group (CG). This list can be obtained, for example, from a database of the operator in which the latter has defined the group, or it can be introduced by the operator by means of configuration files. In the optional case in which to form the control group a percentage of users to be randomly chosen from the group (G) of n users is indicated, this list corresponding to the control group is obtained from the list of n users of the group (G) by applying an automatic selection.

a.3) defining a commercial product (P), with its attributes, indicating those attributes which are to be refined throughout the execution of the method described in this invention: fixed or constant attributes and parametric or variable attributes (A) are thus defined, the latter being those of interest for this method. Subsequent steps of this method must "refine" the commercial product (P) by means of the variation of the specific values which those attributes (A) have (step b.14). According to the values given to those attributes different instances (p) of that commercial product (P) can be defined. As an example, if a commercial product consisting of the offer of a discount percentage on the short messages sent is offered, the only attribute (A) of this commercial product (P) is the value of that discount percentage and, by way of example, four instances (p) of that commercial product would be {p-1: 5% discount in sending SMSs; p-2: 10% discount in sending SMSs; p-3: 15% discount in sending SMSs; p-4: 20% discount in sending SMSs}. If the commercial product consists of the offer of a discount percentage but only during a certain time of the day, the attributes (A) of the commercial product which are defined could be the value of that discount percentage and the specific time of the day at which the discount is offered; 3 instances (p) of this commercial product (P) would be {p–1: 5% discount in sending SMSs at 4 p.m.; p–2: 10% discount in sending SMSs at 7 p.m.; p–3: 10% discount in sending SMSs at 10 p.m.}.

a.4) defining the limits in the values of the attributes (A) of that commercial product (P). The subsequent steps of the method which modify the value of the attributes of the commercial product take into account these limits to always fix the values of the attributes such that they are never exceeded (step b.3). These limits are fixed by the operator or by the supplier of the commercial product in the event of not coinciding. As an alternative to the definition of the limits for the attributes, a more less broad set of instances (p) of the commercial product (P) (set which is referred to as (Cp)) can be defined, so that the steps of the method which refine the commercial product (P) can only choose among one of those instances (p), thus limiting the values to be assigned to each attribute of the commercial product to the set of values of attributes contemplated in those instances belonging to the set (Cp). With this alternative the space of possible instances (Cp) for that commercial product (P) is discretized, whereby the optimization which takes places with subsequent steps is more adjusted the broader the set of allowed instances (Cp) which has been defined.

a.5) introducing in the real-time charging system (OCS) of the network of the operator a information record associated with each of the n users belonging to the group (G) which has been defined and which identifies said group (G) and the commercial product (P) which is to be applied to meet the demand in that group (G) and optimize the function defined by the operator. This information allows the OCS, in addition to executing the steps necessary for the charging process, to invoke the required steps of the method of this invention (b.10 and b.11, described below) at the moment at which a user of the group (G) uses a service of the network and therefore his activity in relation to that service becomes supervised and controlled by the OCS. It should be observed that different commercial products (P) can be applied on the same time period on the same user group (G), all of them intended to optimize the consumption in that group of one or several services.

a.6) introducing in the OCS of the network of the operator an information record associated with each of the m users belonging to the control group (CC) which has been defined. This information allows the OCS, in addition to executing the necessary steps for the charging process, to invoke the required steps of the method of this invention (b.11, described below) at the moment at which a user of the control group (CG) uses a service of the network and therefore his activity in relation to that service becomes supervised and controlled by the OCS. In the event that the users of the control group (CG) have been chosen as a subset of the n users of the group (G), in this step the information which had been introduced in the previous step is eliminated, since the groups (G) and (CG) must be disjoint.

a.7) defining an objective function (F) the value of which is calculated from a mathematical expression (E) formed by variables (V). The variables (V) consider concepts which are measured in the steps of this method (b.10 and b.11, described below) and which are invoked by the OCS when one of the users of the group (G) or of the group (CG) uses one of the services of the network and, therefore, the OCS goes on to supervise and control its use. Thus, the function (F) guides the specific optimization, based on meeting the demand by means of a commercial product, which is intended to be achieved when executing the method of this invention. For example, the telecommunications operator can define as an objective function the revenue obtained from the use of the short message service, the value thereof being calculated by means of a mathematical expression formed by the sum of the number of short messages sent with a certain rate multiplied by the monetary units corresponding to the cost of that rate. Another possible objective function to be defined by the operator can be the profits, thus contemplating any type of variable or fixed expense entailed by the consumption or offering of the service on the telecommunication network of the operator. Also, and without being restrictive, functions such as the number of calls made, the number of contents downloaded or the data traffic of an Internet connection, can be introduced. The expression (E) which allows calculating the value of the objective function (F) can also contain variables (V) measuring the consumption which is being made of other services, not only of that linked to the commercial product offered, such that weightings can be established to eliminate the possibility of optimizing the demand for a service at the expense of an unwanted effect on the demand for another service offered on the telecommunications network of the operator. The steps of the method (b.14) which deal with the refining of the commercial product defined in a previous step (a.3) take as an input the values which the objective function (F) has when a certain instance of the commercial product (p) is offered, which values are calculated by the expression (E), to choose the values of the attributes (A) of the commercial product (P), i.e., the instance (p) of the commercial product which optimizes said function: F(p).

a.8) initializing the value of some criteria, conditions and configurations which for the sake of clarity and understanding are described in the following phases, making reference therein to the fact that that initialization is executed in this step.

b) The second phase consists of the search for the values for the attributes (A) of the commercial product (P) which optimize the function (F), by means of the iterative refining of said attributes. To that end, different instances (p) of the commercial product (P) are offered to different subgroups of users of the group (G) and at different instants of time, obtaining in real time the consumption data of the service corresponding to the commercial product (P). The result of the objective function (F) which is to be optimized is calculated and new values for the attributes (A) of the commercial product (P), obtained by means of known function optimization algorithms, are chosen, such that in a following time period other instances (p) of the commercial product (P) which have more suitable values of attributes to meet the demand and to achieve the optimization of the objective function (F) are offered to the users. This summarized process is thus executed in an iterative manner during successive time periods until a condition of transition to the following phase (defined below) is fulfilled and the steps appearing below are executed in each iteration:

b.1) establishing the conditions which are verified at the end of each iteration (step b.15) to determine whether to go on to the following phase of the method or to continue with a new iteration of this phase. These conditions can be fixed by the operator or supplier of the commercial product in a several ways, such as for example, a certain number of iterations, the definition of an improvement in the optimization of the function which must be exceeded after a number of iterations, etc. These conditions are established in this first step of the first iteration and can be varied when executing this first step in each of the following iterations. The fulfillment of the condition of transition to the following phase indicates that suitable values for the attributes (A) of the commercial product (P) have been found (i.e., an optimal instance (p) of the commercial product (P) for optimizing the objective function (F) defined by the operator).

b.2) taking from the group (G) of n users several disjoint subgroups until having a number k of subgroups (SGs), with an identical or varied size, and chosen according to the criterion of the operator or in an automatic manner. If the control group (CG) has been formed with users belonging to the group (G), the users of the control group (CG) cannot form part of any of the k subgroups which are determined in this step. As a particular case, a single subgroup (k=1) can be determined; the optimization algorithms which are used in a subsequent step do not depend on the fact that k=1. The number k of subgroups (SGs) is fixed by the operator (or supplier of the commercial product) or is determined automatically according to the execution of one of the last steps of the previous iteration (b.14, described below). The joining of the users of all the subgroups (SGs) does not have to cover the entire group (G). Thus, 5 subgroups (SGs) (k=5) of different sizes which do not cover the group (G) in its entirety can be defined: one with 5% of users of the group (G), another one with 7% of users of the group (G), another one with 5% of users of the group (G), another one with 8% of users of the group (G) and a last subgroup with 10% of users of the group (G). If a control group (CG) with 15% of users of the initial group (G) has been previously chosen, there is still 50% of users of the initial group (G) which do not belong to any subgroup (SG) or to the control group.

b.3) determining the k instances (p) of the commercial product (P) which are to be offered to each of the k subgroups (SGs). Therefore, for each instance (p) the values of the attributes (A) of the commercial product (P) must be determined, taking into account the limits established in the previous phase (step a.4) or the configured set of instances (Cp) which restricts the possible alternatives for selecting values for the attributes. In the first iteration of this phase b), the initial values indicated by the operator are chosen or initial values for the attributes (A) are selected automatically. In the following iterations of this phase b), the values of the attributes (A) which define each of the instances (p) of the commercial product (P) are obtained after performing one of the last steps of the previous iteration (b.14, described below), in which the optimization algorithm of the method is executed.

b.4) selecting the time period or term that this iteration lasts, during which measurements relating to the consumption and use of the telecommunication services by the users belonging to the subgroups (SG) and to the control group (CG). This time period or term is configured by the supplier of the commercial product or by the operator of the telecommunications network as a single value for all the iterations or as a specific value for each of the iterations. It can also be altered before starting each of the iterations or during the courses of the time period of an iteration. As a particular case, certain types of commercial products (P) can have the time period or term in which the user can enjoy that commercial product as a fixed or variable attribute, whereby in the case of variable attribute (A) the time period or term in which the measurements are taken is fixed by the choice of each of the instances (p) of the commercial product (P) performed in a previous step.

b.5) introducing in the OCS of the network of the operator an information record associated with each of the users belonging to one of the subgroups (SGs) defined in the previous steps, which identifies the subgroup (SG) and the specific instance (p) of the commercial product (P) which is offered to said subgroup in the present iteration. This information allows, once the OCS passes the control to this method for executing the steps which are subsequently indicated (b.10 and b.11), being able to identify the subgroup (SG) to which the user belongs and the instance (p) of the commercial product (P) which is being offered to him in the current time period and iteration.

b.6) performing in the OCS of the telecommunications network of the operator the provision for each user of the subgroups (SGs) of the instance (p) of the commercial product (P) corresponding in each case. This provision allows the user to subscribe to the instance of the commercial product offered to him, only in the event that the type of commercial product (P) requires a subscription prior to the enjoyment, and to enjoy the features associated with that instance (p) when he performs a use of the service or services affected by this commercial product (P). The OCSs require having in their own databases the configuration of rates and promotions which apply to the services the charging of which they must perform, since they must calculate in real time the monetary units which must be discounted from the user for the use of the service. Therefore, without the execution of this step in which a self-configuration is performed in the OCS, the users would be offered commercial products with conditions which would not be taken into account at the time of charging, with the consequent serious problems which that situation would generate.

b.7) defining and initializing for each subgroup (SG), and therefore for each instance (p) of the commercial product (P) associated with that subgroup, a counter (CNT) for each variable (V) of the expression (E) which allows calculating the value of the objective function (F) defined in the previous phase. Each counter is used to calculate and keep track of the measurements of aggregate consumption relative to each variable (V) of the expression (E) in each of the subgroups (SG) defined; therefore, they are consumption aggregation counters the users of each subgroup (SG). It should be observed that as a particular case one of the variables (V) can correspond to the subscriptions performed when the promotion or incentive (I) required a prior subscription.

b.8) defining and initializing in a specific manner for the control group (CG) a counter for each variable (V) of the expression (E) which allows calculating the value of the objective function (F) defined in the previous phase. Each counter is used to calculate and carry the measurements of aggregate consumption relative to each variable (V) of the expression (E) in the control group (CG) defined; therefore, they are aggregation counters for the users of the control group (CG). It should be observed that, as a particular case, one of the variables (V) can correspond to the subscriptions performed when the commercial product (P) requires a prior subscription to be able to enjoy its features or attributes.

b.9) communicating to the users of each subgroup (SG) the corresponding instance (p) of the commercial product (p), the values of attributes (A) of which have been selected in a previous step (b.3), which is offered to each of the subgroups (SG). The communication of the specific commercial product can be performed by means of the usual communication mechanisms and services which the telecommunications network of the operator has. By way of a non-restrictive example, if the present method is executed for the users of a second generation (GSM) or third generation (UMTS) mobile cellular network, the use of a large account in a Short Message Service Center (SMSC) for sending a SMS short message to each user containing the information of offer of the instance (p) of the commercial product (P) corresponding to said user, together with instructions so that he can perform the subscription in the event that the commercial product (P) is of a type requiring subscription, can be considered.

b.10) in the event that the commercial product (P) requires a prior subscription by the user to enjoy its features or attributes, enabling the mechanisms for capturing the event of subscription to the instance (p) of the commercial product (P) which has been offered to the user. The subscription is performed by the user by any of the various mechanisms which the operator can currently have in his telecommunications network, but it is necessary to capture the event to execute this step of the method. This capture is performed by introducing an information record in the OCS for the user who has subscribed, indicating that the user has subscribed to the instance (p) of the commercial product (P) which has been offered to him. In the event that the objective function (F) defined in the previous phase contains a variable (V) referring to the amount of subscriptions or to the cost, the accumulation is performed in the subscription counter (CNT) of the subgroup (SG) to which the user belongs.

b.11) calculating and accumulating in the corresponding counters (CNT), which are defined and initialized (previous steps b.7 and b.8), the measurements relative to the consumption by the users of each of the subgroups (SG) and of the control group (CG) of the services offered on the network of the operator which are affected by the instance (p) of the commercial product (P) which has been offered to them. The measurements which are taken correspond to the variables (V) of the expression (E) which allows calculating the value of the objective function (F) which was defined in the previous phase (step a.7). Every time one of the users of a subgroup (SG) or of the control group (CC) uses one of the services of the telecommunications network of the operator, the affected elements of this network perform an interaction with the OCS so that the charging of the service is performed in real time. The OCS interprets the information records introduced in previous steps (a.5, a.6, b.5, b.6) and invokes the present step of the method. From the information associated with the consumption of the service by the user, which is received from the telecommunications network in the OCS, the measurements with respect to the variables (V) of the expression (E) are taken in real time, accumulating them in the counter (CNT) associated with each variable (V) and subgroup (SG) or control group (CC) to which the user belongs. The excessive calculations which would be necessary to take the same measurements in the event of having to extract and analyze the information of interest from a data warehouse of the operator are thus not necessary, furthermore achieving an immediate analysis which allows adapting to the current demand of the user group. Accumulations for user events are performed:

if the user belongs to a subgroup (SG) of the group (G) and the commercial product (P) does not require subscription, if the user belongs to a subgroup (SG) of the group (G) and has furthermore subscribed to the instance (p) of the commercial product (P) which has been offered to him in the event that the latter requires subscription to be able to enjoy its advantages, if the user belongs to the control group (CG).

When the user belongs to the group (G) but does not belong to any of the subgroups (SG) defined at the beginning of this iteration, nor belongs to the control group (CC) defined in phase a), accumulations are not performed. The information records associated with each user, and introduced in previous steps in the OCS, allow distinguishing between the previous situations.

b.12) at the end of the time period or term fixed for this iteration, calculating for each of the k subgroups (SG) the value which the objective function (F) has by means of the expression (E), upon assigning to the variables (V) the value of each of the counters (CNT) which have been adding during the current iteration the measurements of consumption relative to each of the variables (V) and subgroups (SG). The value which the objective function (F) has for each subgroup (SG) is an assessment of the effectiveness which the instance (p) of the commercial product (P) which has been applied to each subgroup has had. Thus, samples are obtained of the objective function F(p) which relates the space of instances (p) of the commercial product (P) with the effectiveness thereof to optimize said objective function (F).

b.13) at the end of the time period or term fixed for this iteration, calculating for the control group (CG) the value which the objective function (F) has by means of the expression (E), upon assigning to the variables (V) the value of each of the counters (CNT) which have been adding during the current iteration the measurements of consumption relative to each of the variables (V) for the control group (CG). The value which the objective function (F) has for the control group (CG) allows relativizing the measurements of the effectiveness which the k instances (p) of the commercial product (P) have had and which were calculated in the previous step.

b.14) with the k values obtained for the objective function (F) obtained in this iteration for each of the instances (p) of the commercial product (P) and with the values obtained for the objective function (F) in previous iterations, applying known function optimization algorithms to obtain the values of the parameters which the instances (p) to be applied in the following iteration to continue the process for optimizing the function F(p) must have. It is important to emphasize that the known optimization algorithms can use the values of previous iterations, either explicitly or implicitly according to the type of algorithm. A non-restrictive example consists of using a time window encompassing a certain number of recent measurements, ignoring the previous measurements on the window. The values for the attributes (A) of the commercial product (P) directly obtained from the algorithm may be modified in the third step (b.3) of the following iteration to adapt to the limits defined in the previous phase or to the allowed set of instances (Cp); to perform this adaptation to the instances of (Cp), and without being restrictive, the criterion of minimization of distances between the attributes (A) of the instance (p) obtained from the algorithm and the allowed instances of the set (Cp) can be applied, with distance calculation functions such as the Euclidean, Manhattan or Manhalanobis function. Some examples of known function optimization algorithms which can be applied are Derivative Following, Nelder-Mead (AMOEBA) or Particle Swarm Optimization algorithms. The algorithm also determines the number of subgroups k which must be selected in the following iteration, i.e., the number of experiments to be performed which determine the degree with which the space of the function to be optimized F(p) is explored.

b.15) verifying the conditions established in the first step (b.1) of the current iteration which determine the transition to the following phase c). If those conditions are fulfilled it is considered that an instance (p) of commercial product (P) suitable for optimizing the objective function (F) introduced by the telecommunications operator has been found, i.e., the optimal values for the attributes (A) of the commercial product (P) are available. Thus, the following phase is proceeded to, in which an attempt is made to exploit that commercial product (p) with optimal attributes, while at the same time the demand of the user group is explored to detect time changes. Therefore, that instance (p) of the commercial product (P) which in the last iteration has given rise to a better value of the objective function (F) is the one considered as the optimal instance (p_OPT) for the following phase. If said conditions are not fulfilled, the following iteration of this phase is continued with.

c) The third phase consists of the commercial exploitation of the instance (p) of the commercial product (P) which optimizes the objective function (F) and the optimal attributes of which have been obtained after the iterative execution of the previous phase: optimal instance (p_OPT). This phase of the method is optional. The difference with the previous phase is that here this instance (p) is offered continuously over time to most of the users of the group, since it is already known that said optimal instance (p_OPT) meets the demand in the suitable manner to optimize the function introduced by the telecommunications operator. Furthermore, since the consumption behavior of the users can change over time, explorations are performed every certain time period, which explorations allow detecting those possible changes and suitably modifying the values of the attributes (A) of the commercial product (P), in order to continue having optimal attributes ay all times. To achieve what has been described, the steps of this phase are prepared introducing restrictions in the steps of the previous phase, therefore said restrictions on the steps of the previous phase instead of all the detailed steps are described below:

the operator defines the criteria which launch the exploration to be performed in this phase to detect possible changes in the demand of the user group and be able to adjust the values of the attributes (A) of the commercial product. The exploration is performed by introducing noise values in the attributes (A) of the optimal instance (p_OPT) of the commercial product, in the iterations in which these criteria so determine. It is said that an exploration iteration is that in which the mentioned exploration is performed by means of introducing noise in the values of the attributes. The following are non-restrictive examples of criteria for launching the exploration:

the configuration of a fixed time period after which the exploration is launched, the configuration of a percentage of change in the demand of the group greater than a limit (for which the supervision of the demand of a control group (CG) will be necessary).

These configurations can have default values or be initialized or modified for each execution of the method which is performed. Although for the sake of clarity and understanding this step has been set forth in this third phase, it can also be executed in initial and general configuration phase a) of the method (step a.8) if the information obtained from the execution of the second phase is not to be used to fix the values of these criteria;

the choice of the k subgroups (SG) (step b.2) is restricted such that a single exploitation subgroup (SG_EXPLT) covering a high percentage of the users of the group (G), according to configuration of the operator, is chosen and in the event that this iteration is an exploration iteration other/exploration subgroups (SG_EXPLR) with a reduced size compared to the exploitation subgroup (SG_EXPLT) are defined. The percentages of the exploitation groups or their specific composition have default values and can be modified by the operator of the telecommunications network;

the determination of the k instances (p) of the commercial product (P) which are offered to the subgroups (step b.3) is restricted as follows: the exploitation subgroup (SG_EXPLT) is offered the instance (p) of the commercial product (P) which was determined as optimal (p_OPT) in phase b). In the event of the existence of exploration subgroups (SG_EXPLR) in the current iteration (exploration iteration), they are each offered an instance (p) of the commercial product (P) obtained from altering the value of the attributes (A) of the optimal instance (p_OPT) by means of noise. There are default values which can be modified by the operator of the telecommunications network for each execution of the method, for the noise distribution function and for the percentage limits in the change of value to be introduced on each of the attributes (A) of the optimal instance (p_OPT) to determine the instances (p) of the commercial product (P) to be offered to the exploration subgroups (SG_EXPLR). Although for the sake of clarity and understanding reference has not been made to the noise function configurations and limits of the variations until this phase, those configurations can be executed in initial and general configuration phase a) of the method (step a.8), if the information obtained from the execution of the second phase is not to be used to determine the mentioned configurations. As an alternative to the automatic modification of the values of the attributes (A), the operator can manually select the exploration values for said attributes, i.e., selecting the exploration instances (p);

only in the iterations of exploration (i.e., exploration subgroups have been selected) is the optimization algorithm executed at the end of the iteration (step b.14), which allows obtaining new values for the attributes (A) of a new optimal instance (p_OPT) of the commercial product which takes into account the changes occurring in the demand from when the former optimal instance was determined until the current instant of time;

the conditions which are verified in the final step of the iteration (b.15) allow, in this third phase, to determine when it is necessary to re-execute the steps of the phase b) without the restrictions imposed in this third phase, since a greater exploration is required due to an intense change in the patterns of demand for the service of the telecommunication network affected by the commercial product (P), which demand corresponds to the users of the group (G). These conditions can be fixed by the operator in various ways, such as for example, a certain number of iterations, the definition of a percentage of variation of the value which the objective function has, etc. Although for the sake of clarity and understanding these conditions have not been mentioned until this third phase, they can be fixed in the initial and general configuration phase a) of the method (step a.8) if the information obtained from the execution of the second phase is not be used to fix the values of these criteria, with the option of being modified in the iterations of this phase c).

FIG. 3 shows several iterations of the execution of this third phase. During iterations 1 and 2, the commercial product with optimal attributes found in phase b) is being offered. Furthermore, in said iterations measurements of demand are being taken both in the user group to which the commercial product (SG_EXPLT) is offered and in the control user group (CG). This allows detecting at the end of iteration 2 the fulfillment of the conditions for executing an exploration iteration, in which some subgroups (SG_EXPLR) are offered certain instances (p) of the commercial product (P) with a value of the attributes (A) selected upon introducing noise in the value of the optimal attributes. An exploration iteration is therefore executed in iteration 3, following the steps of phase b) and with the restrictions imposed by this phase c) mentioned above. After that iteration, the optimization algorithm can find a new optimal instance (p) of commercial product (P) for the current demand or, on the contrary, the instance (p) considered optimal until then is continued with. At the end of iterations 4 and 8, the fulfillment of the conditions for executing exploration iterations is detected again. Finally, at the end of iteration 11, it is detected that the conditions are fulfilled in order to again execute the steps of phase b) without restrictions, due to intense changes in the demand of the users.

Furthermore, the invention relates to a system for optimizing the consumption of telecommunications services in user groups based on the analysis of their aggregate behavior, by means of using a commercial product offered to the users in successive time periods and the attributes of which are refined between said time periods until obtaining the values for the attributes of said commercial product which allow optimizing an objective function defined by the operator or service provider offering the service.

The system comprises the means necessary for executing each of the steps of the phases of the method described above:
  general and initial configuration phase,
  iterative phase for the search for the values suitable for the attributes of the commercial product which optimize the objective function defined by the operator,
  exploitation phase for exploiting the optimal attributes of the commercial product, found in the previous phase, and of exploratory activity for detecting changes in the demand which involve varying the values of said optimal attributes.

The means can comprise elements such as user interfaces in which the operator is given the advances of the method or the configurations that he must perform, tables in supports such as databases which include configuration information of the method, interfaces with the modules of the OCS which allow the latter to invoke certain steps of the method described or incorporate or modify information stored in said OCS, etc.

Finally, the invention relates to a program product comprising program instruction means for carrying out the method described above when the program is executed in a computer associated with a telecommunications network. The product can be stored in a program carrier medium, for example, in the internal memory of a computer, in a database of a telecommunications network, in a CD-ROM, a diskette, etc.

The description of a preferred embodiment of the invention is provided below.

To aid in understanding the invention, a practical case is briefly described throughout this section in which there are specific examples of a telecommunications service the demand for which is to be met, a commercial product chosen for that purpose, the attributes in question of said commercial product, a function to be optimized, an algorithm determined for performing the optimization of the function and all those elements that were generically described when describing the method, system and product object of the invention above.

Thus, in one embodiment of this invention the telecommunications operator wishes to determine the optimal attributes for marketing an Internet access data voucher for his pre-paid mobile telephony clients with a certain charging plan. The data voucher is a commercial product (P) offered by the telecommunications operator that gives the client the right to browse on Internet from the line he has contracted up to a maximum volume of data for a limited time, being characterized by three attributes:
  validity period (v)
  price (c)
  size (s), i.e., sum of the uplink and downlink browsing traffic which the line of the user may generate In order for the user to be able to enjoy the data voucher, he must perform a subscription in which the price (c) of the subscribed data voucher is discounted from the balance of his pre-paid account. In this case the operator wishes to maintain the attribute validity period (v) constant, with a value introduced by him in the system, whereas the price (c) and the size of the voucher (s) are marked in the system as variable attributes (A).

The operator also has to define the objective function (F) which guides the meeting of the demand that the users make of the data voucher, since it is the function to be optimized by the method and system by means of refining the attributes (A) of the data voucher. As an example, is it assumed in this case that the objective function (F) chosen by the operator is the revenue obtained by the sales of the data voucher. In order to be able to execute the method for optimizing, the operator must introduce the variables (V) that must be used by the method for calculating the value of the function when a certain instance of the data voucher is offered to the users and their behavior with respect to that specific offer is analyzed. In this case, the revenue obtained by the sale of an instance of the data voucher will be calculated from two variables:
  (V1) number of subscriptions for the certain instance of the data voucher
  (V2) value of the price (c) attribute of that instance of the data voucher As can be observed, the elements mentioned up until now constitute the main input parameters required by the method described in this invention for carrying out the function thereof: solving the drawbacks posed by determining, without excessive calculations and with great immediacy, the optimal values of the variable attributes (A) of the data voucher, i.e., price (c) and size (s), which maximize the revenue of the operator relative to the sale of that commercial product (P) used to meet the data traffic consumption of his pre-paid clients.

In addition to the previously mentioned elements, for applying the method the operator must define other initial conditions corresponding to the steps of phase a) of the method explained above. This process consists of:

Choosing from among the clients of the target pre-paid charging plan a sample formed by n clients for the experimental group (G) and another sample formed by m clients for the control group (CG). The experimental and control groups must be disjoint, one and the same client not being able to belong to both. The clients who will be informed of the different instances of the commercial product which will be offered during the process for iterative refining of values of the variable attributes will be chosen from the experimental group. In this practical case, the definition of a control group (CC) will not be considered.

Specifying the limit values which the variable attributes of the voucher can have, defining the search space of the solution. The operator can also choose to define a limited set of instances of data vouchers which could be offered to the users, but in this example it is assumed that the values of the variable attributes (A) are limited to:

the value of the price (c) attribute of the message voucher must always be between 5 and 40 monetary units the value of the size (s) attribute of the message voucher must always be between 25 megabytes and 500 megabytes Choosing an algorithm for the search for the optimal values of the variable attributes (A) of the commercial product, in this case the message voucher. The method and system object of the invention offer the operator different options of known optimization algorithms, such as Nelder-Mead (AMOEBA), Derivative Following, Model Optimizer or Particle Swarm Optimization algorithms, without being restrictive. In the example it is assumed that the user of the system decides to use the Particle Swarm Optimization (PSO) algorithm.

Defining a threshold of change in the revenue for the sale of the data voucher below which the search for the optimal values of the variable attributes (price and size) of the voucher ends.

PSO is a stochastic algorithm which is applied to solving optimization problems. The PSO algorithm simulates the behavior of a particle swarm, characterized by position and speed, which particles move through the search space, each of them recording their best position (lbest), i.e., that which resulted in the best evaluation of the objective function, and sharing said information with the rest of the particles. The movement of a particle is governed by equations for updating its position and speed, which take into account its best position reached (lbest), the best position reached among all the particles (gbest) and/or the best position reached among all the neighboring particles (vbest). In the most basic form of the PSO algorithm, these rules are:

$$v(i,j+1)=w*v(i,j)+c1*rand(\ )*(gbest(j)-x(i,j))+c2*rand(\ )*(lbest(i,j)-x(i,j))$$

$$x(i,j+1)=x(i,j)+v(i,j)$$

where:
$v(i,j)$ is the speed of the particle i in iteration j
$x(i,j)$ is the position of the particle i in iteration j
w is a constant coefficient of inertia
c1 and c2 are constant coefficients of acceleration
rand( ) is a random number between 0 and 1
$gbest(j)$ is the best position of all the particles obtained until iteration j
$lbest(i,j)$ is the best position of particle i obtained until iteration j The PSO algorithm converges towards an optimal solution, since, after each iteration, the evaluation of the objective function in the best position (gbest) improves, although this solution can be a local rather than global optimum. There are many variants of the basic PSO algorithm with which accelerating the convergence towards the optimal solution, reaching a global optimum or improving the robustness thereof against variations over time of the objective function (F), such as for example slight random movements of the particles every certain iterations, are achieved.

Once the initial conditions are selected, in the phase of iterative refining of the values of the variable attributes of the voucher begins. In each iteration, k subgroups of clients are selected from the group (G), k being the number of particles used by the PSO algorithm which is maintained constant during the search process. The subgroups must be formed such that no client can belong to more than one subgroup, and the composition thereof can be maintained constant or changed between the different iterations of the search process.

Each subgroup is assigned a particle of the PSO algorithm, the position of which is represented by a combination of the variables of the search space of the solution, i.e., the price (c) and size (s) of the data voucher in this case. Therefore, the position coordinates of each particle in an iteration determine the instance (p) of the commercial product which is offered to each subgroup. Those position coordinates in the search space, corresponding to price and size of the data voucher, are determined as follows:

In the first iteration the price and size of the data voucher are calculated randomly, evidently taking into account the limits for its values, previously introduced in the system by the operator.

In successive iterations, the price and size of the data voucher are calculated by applying the equations for updating position and speed of the PSO algorithm.

Once the user subgroups (SG) and the instance (p) of the data voucher which will be offered to each subgroup in the current iteration are defined, the configurations suitable for executing the subsequent steps of the method must be introduced in the OCS. Thus, it is necessary to perform the provision of the instance of the data voucher to the users of each subgroup, such that the users can purchase the voucher and enjoy its particular conditions.

The following step is the initialization of the counters (CNT) which keep track of the aggregate consumption of the instance (p) of the data voucher in each of the k subgroups (SG) of the iteration. Those counters are associated with the variables (V) which allow calculating the value of the objective function (F); in the example being described, the objective function is the revenue obtained by the sales of the data voucher, calculated by means of the multiplication of the number of subscriptions (variable V1) and of the value of the price (c) attribute (variable V2) of the instance (p) of the data voucher. Accordingly, and given that the variable (V2) is constant for each iteration within a certain user subgroup, the system manages only one counter (CNT1) per subgroup (SG) in this example, which will add the number of subscriptions to the data voucher produced in that iteration; there will be a total of k counters (CNT1).

The system also sends the users of each of the k subgroups (SG) a notification of the commercial offer with instructions for performing the subscription. In the particular example herein discussed, corresponding to a GSM network, the system can send the notification to each user by means of SMS, through the short message center of the telecommunications operator, in which the user is informed of the specific offer of the message voucher corresponding to the subgroup (SG) to which the user belongs.

From that moment, when one of the users of one of the subgroups (SG), which has been offered an instance of the data voucher, makes a purchase of the voucher, the system adds a unit to the aggregate account maintained in the counter (CNT1) corresponding to the subgroup to which the user who has made the purchase belongs.

At the end of the time period of the iteration, determined in this case by the constant validity period (v) attribute, the value of the objective function (F) is calculated for each subgroup (SG) from the value which the counter (CNT1) has, which accumulates the number of subscriptions, and the value of the price (c) attribute of the instance (p) of the data voucher which has been offered to the subgroup in that iteration. Therefore, k values of the objective function (F) to be optimized, corresponding to the revenue achieved in each subgroup (SG) by the sale of the data voucher offered to that subgroup, are obtained as a result of this analysis of aggregate behavior in the subgroups (SG). Those values are the input of the PSO algorithm in that iteration, since they correspond to the evaluations of the function to be optimized for each of the k particles.

With those evaluations of the present iteration, the PSO algorithm saves only the last position and speed of each particle in the record, and it updates the best position reached by each particle (Ibest) as well as the best global position of all the particles (gbest). Accordingly, the results achieved by the PSO algorithm in preceding iterations are explicitly discarded, but information of past iterations is implicitly being maintained through the values (Ibest) and (gbest). The result of the execution of the algorithm in the iteration will be a new position for each of the k particles, i.e., new values for the price (c) and size (s) attributes of the data voucher to be offered to k user subgroups in the following iteration. The best global position of all the particles (gbest) will gradually improve the evaluation of the objective function (F) as it moves forward in the iterations, increasingly better values thus being found for the attributes (A) of the commercial product. The process of iterative refining ends when the improvement in the evaluation of the objective function for the best position of all the particles does not exceed the defined threshold.

Figure 4:
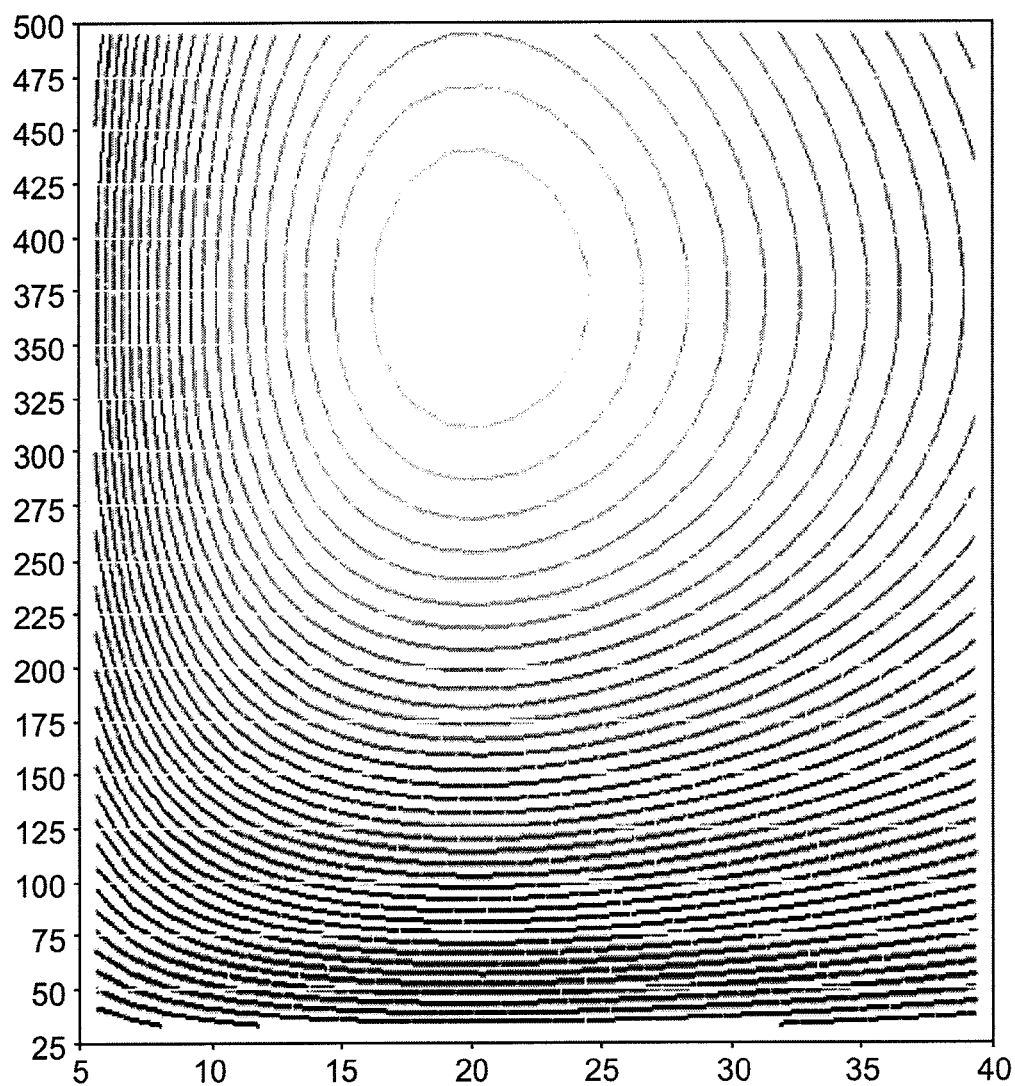
FIG. 4 shows a depiction of the objective function used in the practical case shown in the section of preferred embodiment of the invention.

To show an operating example of the dynamic and iterative adjustment of the variable attributes (A) of the data voucher, an example in which the demand of the users of the group (G) is simulated by means of an analytical function having the price (c) and the size (s) of the data voucher as independent variables, therefore being a two-dimensional function, will be assumed. The variation of the demand with respect to the price considering the constant size is exponential, there being lower demand for the voucher as the price increases. On the other hand, the variation of the demand with respect to the size of the voucher considering the constant price first increases until reaching a maximum at 375 MB and subsequently decreases gradually; the latter simulates the psychological behavior of users who consider that the size of the voucher is excessive for their standard consumption, causing a lower demand for very large sizes of the data voucher. The revenue for the sale of the data voucher, which is the function to be optimized by the method, can be obtained from the demand function of the users of the group (G) by means of multiplying it by the price (c) of the data voucher; therefore, the revenue function is also a function dependent on two variables: price (c) of the data voucher and size (s) of the data voucher. It must be borne in mind that the optimization algorithms considered for the method and system of the invention, such as PSO, do not require knowing beforehand the demand function of the users of the group (G) and here this function is simply used to perform a simulation; the method object of the invention is based on an analysis of the demand given a dynamic variation of the commercial product offered to the users, a technique used to prevent the need for a prior demand model. FIG. 4 represents the revenue function for the revenue generated by the sale of the data voucher by means of level curves, in which it can be seen that the maximum revenue is produced when a data voucher of 375 megabytes and 20 monetary units is offered.

In the first iteration, the position of the k particles is determined automatically and randomly according to the configuration introduced by the operator, and always considering the limits for the values of the variable attributes (V) introduced by the latter. Furthermore, it is assumed that the operator has chosen to use 15 user subgroups (SG) within the group, or in other words, 15 particles. The positions for k (k=15) particles in the first iteration are those shown in the first row of the following table 1, the first value representing the price (c) of the data voucher in monetary units and the second value the size of the data voucher in megabytes.

TABLE 1

| i | p1 | p2 | p3 | p4 | p5 | p6 | p7 | p8 | p9 | p10 | p11 | p12 | p13 | p14 | p15 |
|---|----|----|----|----|----|----|----|----|----|-----|-----|-----|-----|-----|-----|
| 1 | 25-444 | 25-367 | 34-287 | 39-149 | 24-117 | 10-68 | 22-225 | 13-150 | 29-418 | 15-140 | 22-314 | 18-499 | 7-163 | 7-109 | 34-180 |
| 2 | 21-404 | 21-351 | 29-295 | 34-199 | 22-177 | 15-143 | 24-263 | 18-200 | 24-386 | 20-193 | 22-314 | 23-443 | 12-209 | 12-171 | 31-265 |
| 3 | 21-338 | 21-351 | 25-364 | 29-299 | 21-277 | 18-243 | 22-363 | 20-300 | 22-343 | 21-293 | 21-360 | 22-343 | 17-309 | 17-271 | 26-365 |
| 4 | 21-368 | 21-355 | 25-362 | 29-326 | 21-313 | 18-294 | 22-362 | 20-326 | 22-350 | 21-322 | 21-360 | 22-350 | 17-331 | 17-310 | 26-363 |
| 5 | 21-368 | 21-380 | 20-374 | 24-407 | 21-413 | 22-394 | 21-374 | 21-407 | 21-385 | 21-411 | 21-375 | 21-385 | 22-402 | 22-410 | 21-374 |

After obtaining the evaluation of each particle in the first iteration, the formulas of the PSO algorithm are applied, resulting in the new positions for the particles, determining the 15 new instances of the data voucher which will be offered to the k subgroups (k=15) in the second iteration. The process is repeated iteration by iteration and the algorithm maintains the value of the best global position obtained up to that moment (gbest). Table 2 shows the evolution of the value (gbest) in the 5 first iterations, i.e., of the best instance (p) of the data voucher which has been found up until that iteration for optimizing the objective function (F).

TABLE 2

| i | gbest |
|---|---|
| 1 | 22-314 |
| 2 | 21-351 |
| 3 | 21-360 |
| 4 | 21-368 |
| 5 | 20-374 |

As can be seen in Table 2, the maximum of the objective function (F) is already very close in 5 iterations and the condition of transition to the third phase of the method of commercial exploitation is fulfilled since the threshold of change in the revenue defined at the beginning of the execution of the method has not been exceeded.

Figure 5:
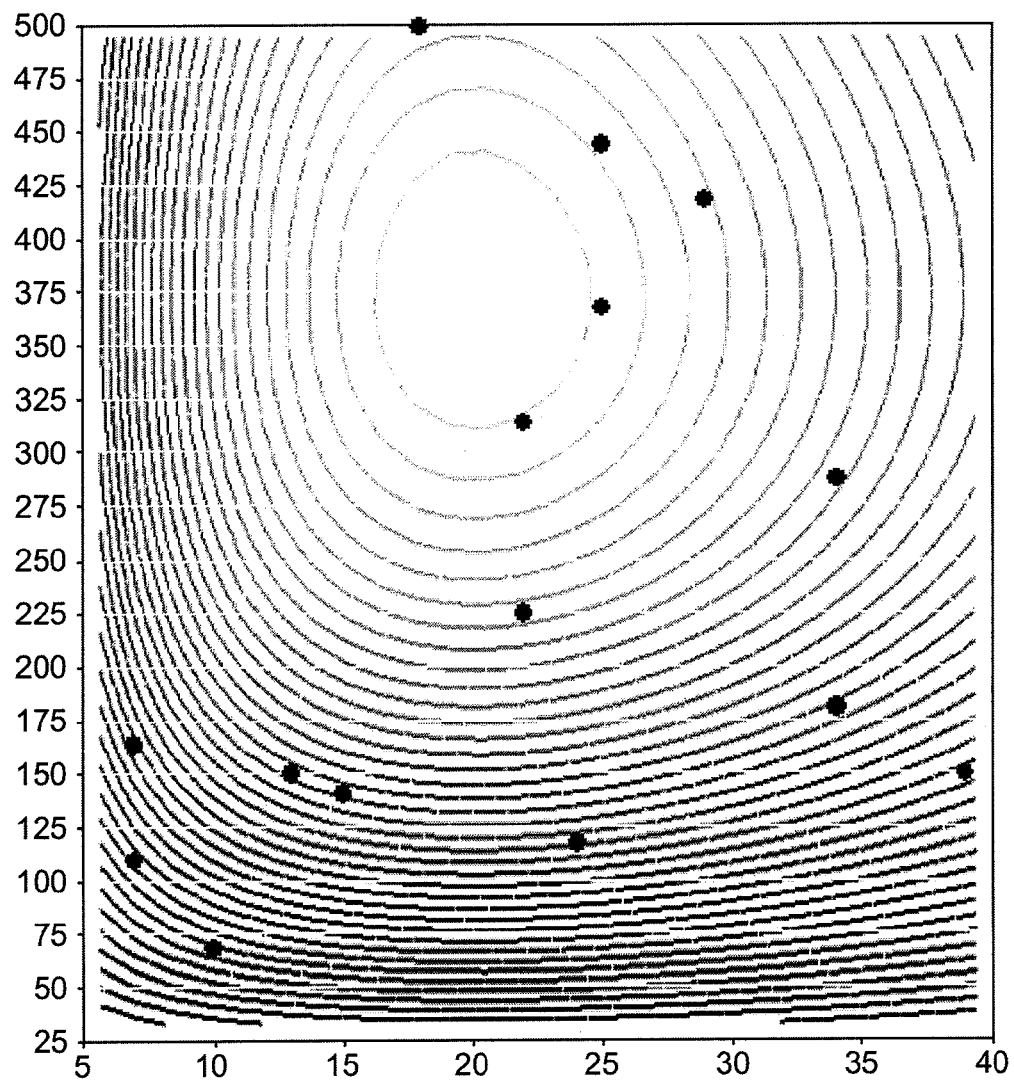
FIGS. 5 to 7 show the evolution of the particles of the PSO algorithm, which represents instances of the commercial product employed to meet the consumption of the users, used in the practical case shown in the section of preferred embodiment of the invention.
Figure 6:
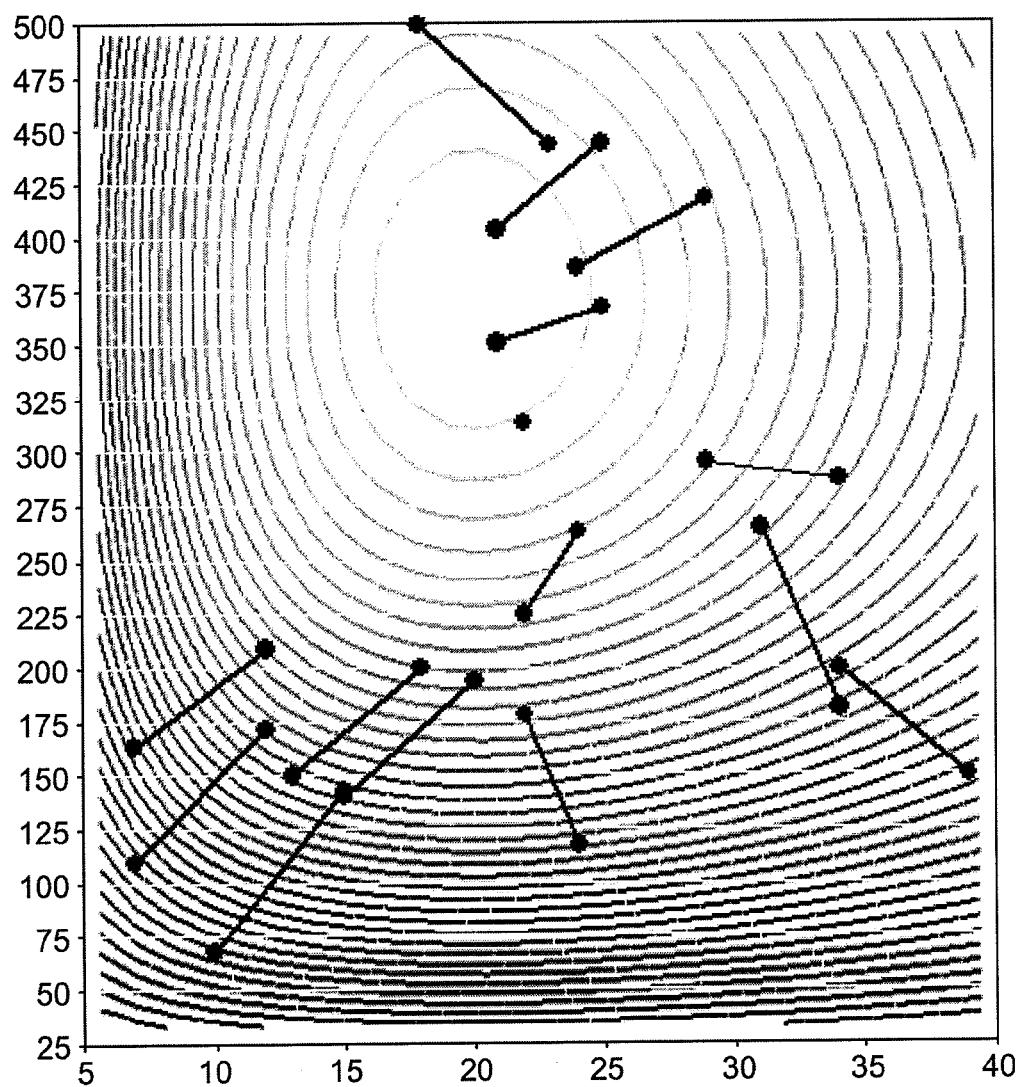
Figure 7:
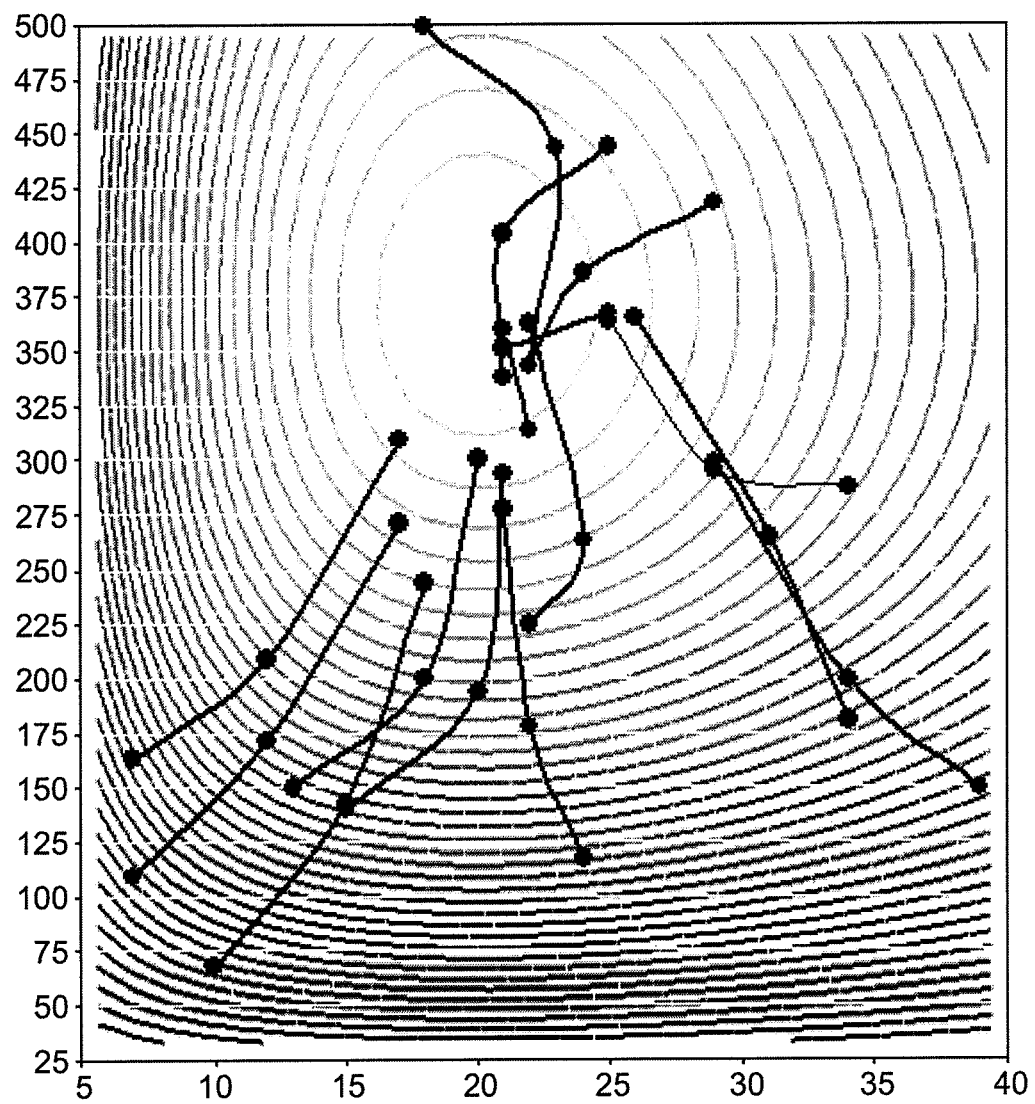
Figure 8:
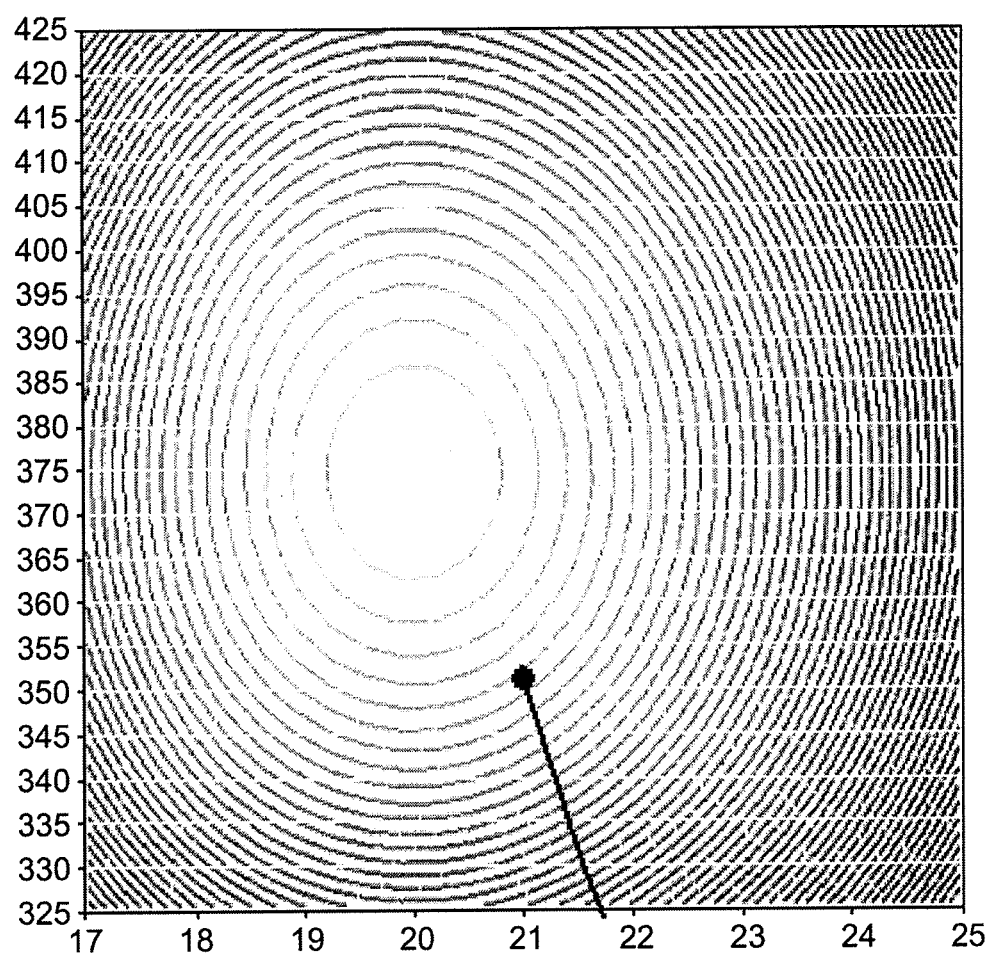
FIGS. 8 to 11 show the evolution of the best position of the PSO algorithm (gbest) throughout the execution of the method of this invention applied to the practical case shown in the section of preferred embodiment of the invention.
Figure 9:
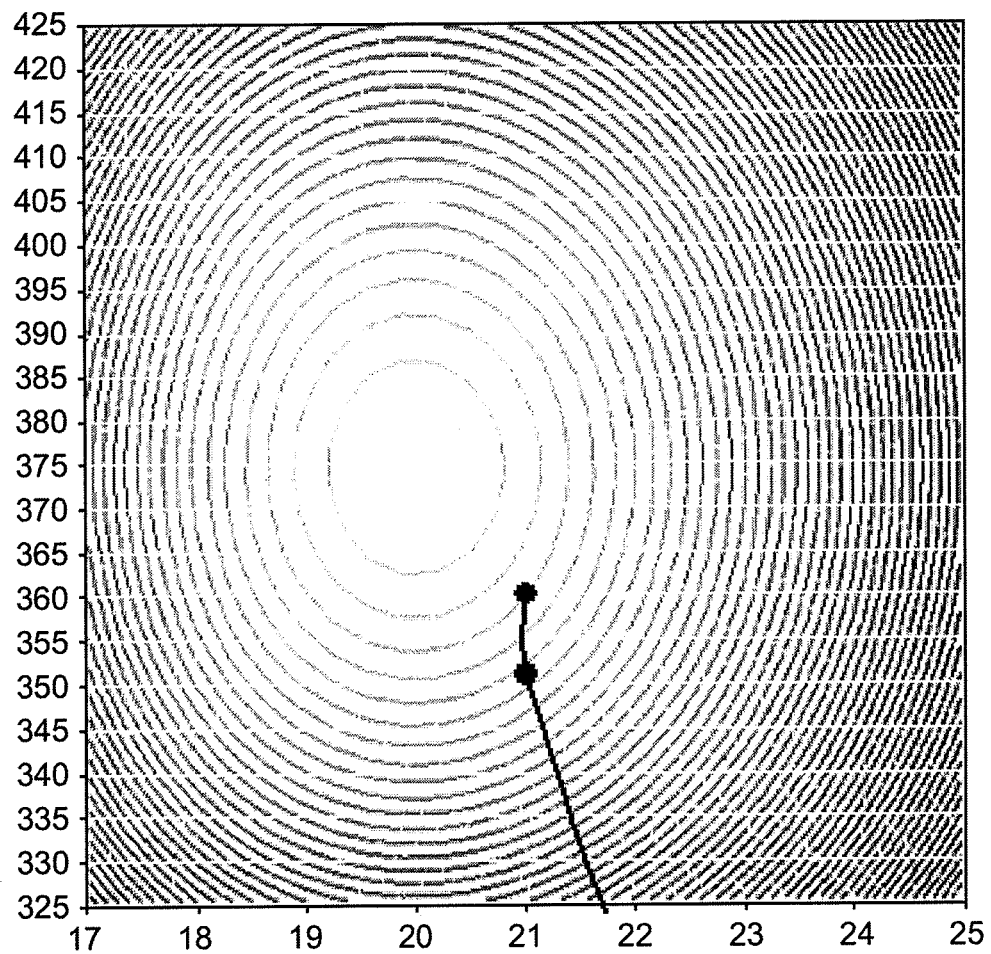
Figure 10:
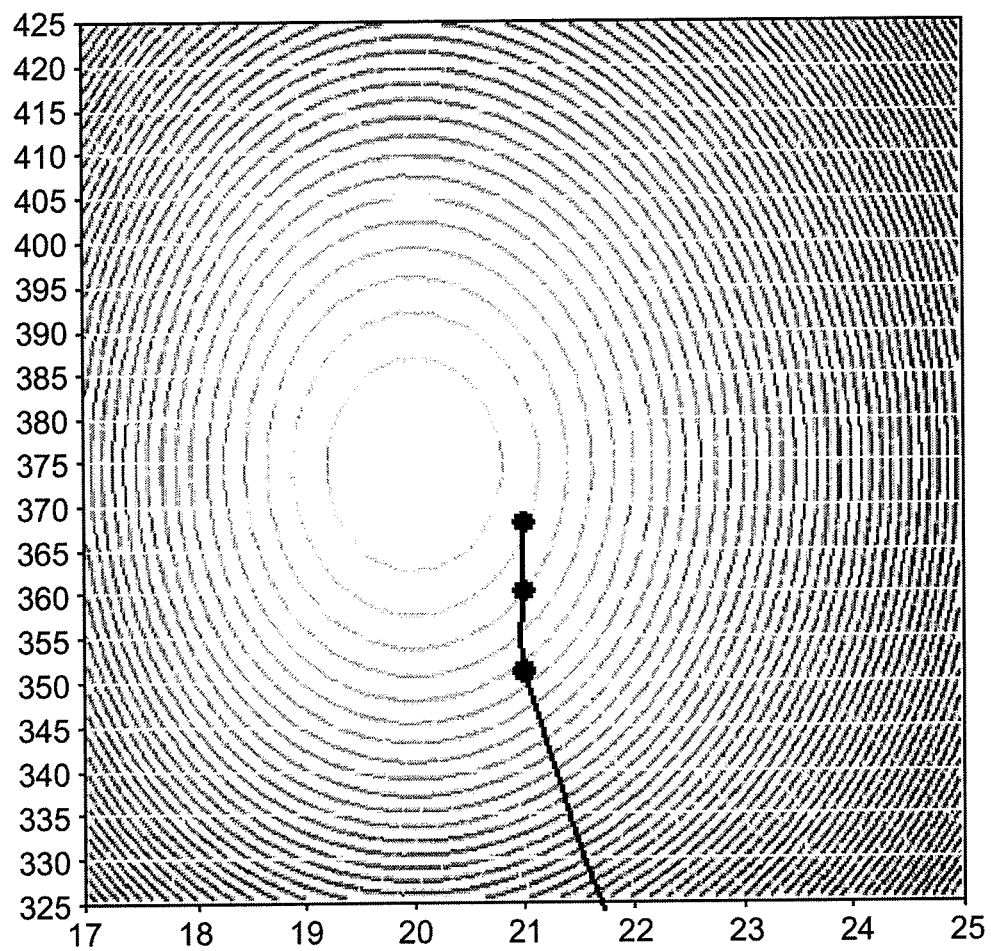
Figure 11:
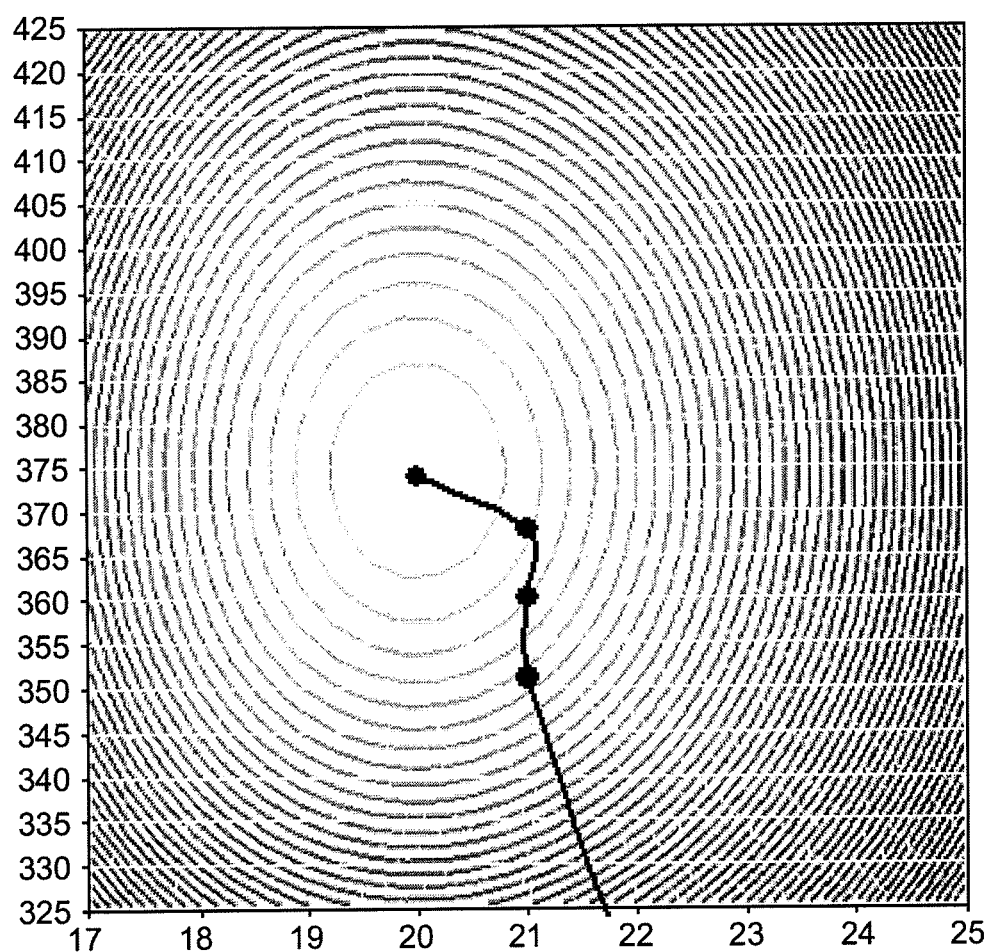

FIGS. 5 to 7 show the graphic representation of the evolution of the 15 particles in the first 3 iterations, the movement of the particles towards the maximum of the simulated revenue function and represented by means of level curves (iterations 4 and 5 are not shown for the sake of clarity of the graphs) being observed therein. FIGS. 8 to 11 show a detail in the environment of the maximum of the function, of the evolution between iterations 2 and 5 of the best position of all the particles up until that moment (gbest) and the convergence thereof towards the optimal solution.

During the commercial exploitation phase, all the clients of the objective segment are offered the optimal commercial product (p_OPT) obtained with the process of iterative refining (a data voucher of 20 monetary units and 374 megabytes as variable attributes), and the demand of the users of the control group (CG) is monitored by carrying out periodic evaluations of the objective function (F) for said group. Given that the number of users of the control group (CG) and the number of users to whom the optimal commercial product is offered can be different, the objective function (F) will be weighted so as to allow evaluating when the difference between the mean value of the weighted objective function in the control group (CG) and the best evaluation obtained in the last phase of iterative refining exceeds a configurable threshold; it will also be possible to configure a time from the last iteration in which a new search for the optimal commercial product (p_OPT) is started, the phase of iterative refining of values of its variable attributes being repeated.

In order to comply with all the processes and steps of the method described in this practical use case, the system comprises:
  means for defining a user group (G) and a control group (CG);
  means for defining a commercial product (P) and its fixed and variable attributes (A), the latter being those which will be refined by the method;
  means for configuring limits to the values that the variable attributes (A) can have or for restricting them to a certain subset of values;
  means for interacting with other modules of the OCS and being able to access information stored therein, introducing or modifying information therein or configuring and providing parameters, as described in the phases and steps of the method in the description of the invention;
  means for defining an objective function (F), with the variables (V) that must be used and/or measured for calculating said objective function;
  means for configuring in the system conditions for the transition from the exploration phase to the commercial exploitation phase and so that once in the commercial exploitation phase it moves again to the exploration phase when intense time variations in the consumption by the users of the commercial product are detected;
  means for defining subgroups (SG) within the group (G) to be offered different instances (p) of the commercial product in each iteration;
  means for choosing the instances (p) of the commercial product which will be offered to each of the subgroups (SG) in each iteration;
  means for communicating to the users of each of the subgroups the offer of the instance (p) of the commercial product corresponding to the subgroup (SG) to which the user belongs, as well as indicating instructions for the subscription or purchase of the product if necessary;
  means for defining and initializing the counters (CNT) which will accumulate the consumptions of the users of each subgroup (SG) according to the variables (V) which allow calculating the objective function (F);
  means for receiving from the modules of the OCS the notifications of consumptions of the users relating to the variables (V) which allow calculating the value of the objective function (F), accumulating said consumptions in the counters (CNT);
  means for applying the optimization algorithm selected by the operator in each execution of the method, taking the values of aggregate consumptions of the users of each subgroup (SG), which are obtained from the counters (CNT) at the end of each iteration; the result of the execution of the algorithm in each iteration determines values for the variable attributes (V) of the instances (p) of the commercial product (P) to be offered in the following iteration;
  means for verifying if the conditions for the transition from one phase to another phase of the method, which have previously been configured by the operator, are met;
  means for providing interfaces for introducing and displaying information to the user of the system such that he can configure the parameters of the method and system which allow configuration and perform a follow-up of the execution of the method and its steps.

Throughout the present description and claims the word "comprises" and variations thereof, such as "comprising", do not intend to exclude other steps or components.

The invention claimed is:

1. A method for optimizing the consumption of a telecommunications service, wherein said service is offered by means of a telecommunications network comprising a real-time charging system, wherein the method comprises:
  defining a commercial product associated with said service, comprising a plurality of variable attributes and a set of values which said variable attributes can have;
  selecting a user group comprising n users of said service and a control user group comprising m users of said service;
  defining an objective function comprising a plurality of variables which allow measuring the consumption of said service;
  searching for the values for said variable attributes of the commercial product which optimize the objective function using the real-time charging system,
  wherein said search for the values for said variable attributes of the commercial product which optimize the objective function is performed according to the following iterative cycle:

selecting k subgroups from the group of n users such that no user can belong to more than one subgroup and assigning for each of said subgroups an instance of the commercial product by means of selecting different values for said variable attributes within the set of values which said variable attributes can have;

collecting a plurality of measurements of consumption of said telecommunication service by the users of each subgroup during a certain time period, and starting counters associated with each of the variables of the objective function;

communicating to the users of each subgroup the corresponding instance of the commercial product, giving them the possibility of subscribing to same if said subscription is necessary;

assigning in the real-time charging system of an operator the corresponding instance of the commercial product to the users of the subgroups;

calculating and accumulating the counters associated with each of the variables of the objective function from the measurements collected by the real-time charging system relative to the consumption by the users of each of the subgroups of the service affected by the instance of the commercial product offered;

at the end of said certain time period, calculating the k values of the objective function obtained from the consumption counters of each subgroup as well as the value of this objective function for the control group; and applying a function optimization algorithm taking as an input the k values of the objective function of the previous step and the values obtained in previous iterations, thus obtaining the values of the variable attributes for defining the instances of the commercial product to be offered in the following iteration.

2. Method according to claim 1, further comprising:
defining ending conditions for a search for the values of the variable attributes of said commercial product;
and after each iteration of the iterative cycle, evaluating the ending conditions for the search for the values of the variable attributes and continuing with the following iteration of the iterative cycle.

3. Method according to claim 1, wherein the number k of subgroups can be equal to or greater than 1, being able to be different in each cycle.

4. Method according to claim 1, wherein the users forming part of the subgroups and of the control group are randomly selected in an automatic manner or are explicitly defined by the operator of the system.

5. Method according to claim 1, wherein the objective function optimization algorithm is applied without previously knowing or estimating the curve of demand for the telecommunications services affected by the commercial product.

6. Method according to claim 1, wherein the optimization algorithm only considers the last measurements of the objective function taken within a window ignoring the previous measurements, wherein said window is expressed in terms of time or number of iterations.

7. Method according to claim 1, further comprising: commercially exploiting the instance of the commercial product which optimizes the objective function, the variable attributes of which have been obtained.

8. Method according to claim 7, wherein a search for the values for the variable attributes in the commercial exploitation phase is started after a fixed time has elapsed from the last search or when a percentage of the change of the objective function for the users of the control group exceeds a defined threshold.

9. Method according to claim 1, wherein the values of the variable attributes of the commercial product calculated by the optimization algorithm and which are outside the search space of the solution are automatically modified to be placed inside said space applying the criterion of minimizing the distance between the values of the attributes.

10. Method according to claim 1, wherein the search space of the variable attributes of the commercial product can be defined by indicating a range per attribute.

11. Method according to claim 1, wherein the objective function can contain variables measuring the consumption which is being made of services which are not the one linked to the commercial product offered.

12. Method according to claim 1, wherein the commercial product includes its validity term or period as a fixed or variable attribute.

13. Method according to claim 12, wherein if the commercial product includes its validity term or period as an attribute, the duration of an iteration is the maximum value of said attribute for the instances of the commercial product (P) offered in said iteration.

14. Method according to claim 1, wherein the time period or term of an iteration is configured by the operator of the telecommunications network as a single value for all the iterations or as a specific value for each of the iterations.

15. Method according to claim 1, which comprises interacting with the real-time charging system of the operator to provide support for a capacity to dynamically generate instances of the commercial product, offering them to different groups, and calculating and adding counters which allow evaluating the objective function from the consumptions that the users of these groups perform.

16. A system comprising a processor, at least one database, and a memory, coupled to the processor, wherein the processor performs the steps of a method for optimizing the consumption of a telecommunications service, wherein said service is offered by means of a telecommunications network comprising a real-time charging system, wherein the method comprises:

defining a commercial product associated with said service, comprising a plurality of variable attributes and a set of values which said variable attributes can have;

selecting a user group comprising n users of said service and a control user group comprising m users of said service;

defining an objective function comprising a plurality of variables which allow measuring the consumption of said service;

searching for the values for said variable attributes of the commercial product which optimize the objective function using the real-time charging system, wherein said search for the values for said variable attributes of the commercial product which optimize the objective function is performed according to the following iterative cycle:

selecting k subgroups from the group of n users such that no user can belong to more than one subgroup and assigning for each of said subgroups an instance of the commercial product by means of selecting different values for said variable attributes within the set of values which said variable attributes can have;

collecting a plurality of measurements of consumption of said telecommunication service by the users of each subgroup during a certain time period, and starting counters associated with each of the variables of the objective function;

communicating to the users of each subgroup the corresponding instance of the commercial product, giving them the possibility of subscribing to same if said subscription is necessary;

assigning in the real-time charging system of an operator the corresponding instance of the commercial product to the users of the subgroups;

calculating and accumulating the counters associated with each of the variables of the objective function from the measurements collected by the real-time charging system relative to the consumption by the users of each of the subgroups of the service affected by the instance of the commercial product offered;

at the end of said certain time period, calculating the k values of the objective function obtained from the consumption counters of each subgroup as well as the value of this objective function for the control group; and applying a function optimization algorithm taking as an input the k values of the objective function of the previous step and the values obtained in previous iterations, thus obtaining the values of the variable attributes for defining the instances of the commercial product to be offered in the following iteration.

17. A non-transitory computer-readable medium storing a program which, when executed by at least one processor, causes the at least one processor to perform a method for optimizing the consumption of a telecommunications service, wherein said service is offered by means of a telecommunications network comprising a real-time charging system, wherein the method comprises:

defining a commercial product associated with said service, comprising a plurality of variable attributes and a set of values which said variable attributes can have;

selecting a user group comprising n users of said service and a control user group comprising m users of said service;

defining an objective function comprising a plurality of variables which allow measuring the consumption of said service;

searching for the values for said variable attributes of the commercial product which optimize the objective function using the real-time charging system, wherein said search for the values for said variable attributes of the commercial product which optimize the objective function is performed according to the following iterative cycle:

selecting k subgroups from the group of n users such that no user can belong to more than one subgroup and assigning for each of said subgroups an instance of the commercial product by means of selecting different values for said variable attributes within the set of values which said variable attributes can have;

collecting a plurality of measurements of consumption of said telecommunication service by the users of each subgroup during a certain time period, and starting counters associated with each of the variables of the objective function;

communicating to the users of each subgroup the corresponding instance of the commercial product, giving them the possibility of subscribing to same if said subscription is necessary;

assigning in the real-time charging system of an operator the corresponding instance of the commercial product to the users of the subgroups;

calculating and accumulating the counters associated with each of the variables of the objective function from the measurements collected by the real-time charging system relative to the consumption by the users of each of the subgroups of the service affected by the instance of the commercial product offered;

at the end of said certain time period, calculating the k values of the objective function obtained from the consumption counters of each subgroup as well as the value of this objective function for the control group; and applying a function optimization algorithm taking as an input the k values of the objective function of the previous step and the values obtained in previous iterations, thus obtaining the values of the variable attributes for defining the instances of the commercial product to be offered in the following iteration.

* * * * *